United States Patent [19]

Roberts et al.

[11] E Re. 28,835

[45] Reissued June 1, 1976

[54] WORK CABINET FOR SEWING MACHINE

[75] Inventors: Kent S. Roberts, American Fork, Utah; Stanley D. Roberts, Albuquerque, N. Mex.

[73] Assignee: Roberts Mfg., Inc., American Fork, Utah

[22] Filed: Aug. 15, 1975

[21] Appl. No.: 604,953

Related U.S. Patent Documents

Reissue of:

[64] Patent No.: 3,788,716
Issued: Jan. 29, 1974
Appl. No.: 278,222
Filed: Aug. 7, 1972

[52] U.S. Cl. ..... 312/29; 112/217.1; 112/258; 108/92; 312/22; 312/208

[51] Int. Cl.[2] ..... A47B 29/00; A47F 05/08

[58] Field of Search ..... 312/22, 23, 26–29, 312/208, 306, 258; 112/260, 217.1, 63; 108/17, 92

[56] References Cited

UNITED STATES PATENTS

| | | | |
|---|---|---|---|
| 2,486,564 | 11/1949 | Kamin | 312/29 |
| 2,887,350 | 5/1959 | Cotton et al. | 312/29 |
| 3,306,690 | 2/1967 | Gibson et al. | 312/208 |
| 3,468,589 | 9/1969 | Maynard | 112/217.1 |
| 3,726,237 | 4/1973 | Devey, et al. | 112/217.1 |

*Primary Examiner*—Casmir A. Nunberg
*Attorney, Agent, or Firm*—Mallinckrodt & Mallinckrodt

[57] ABSTRACT

A work cabinet, for mounting a sewing machine in different work positions and for housing the machine when not being worked, provides a drop shelf interiorly of the cabinet below the top working surface thereof for lowering the machine into the interior of the cabinet. The drop shelf carries a mount for the machine, by means of linkage which permits raising and lowering of the machine to different work positions. Pivotally fulcrumed on the drop shelf is a lever having a work arm and a power-input arm, the former underlying the machine mount so as to raise and lower the sewing machine when power, usually manual, is applied to the latter. The cabinet is well adapted to open-arm types of sewing machines, and is provided with a removable insert for its apertured top wall as an extender for the limited work surface of such top wall in the work positions of the machine. The insert fits around the machine and closes the aperture provided in the top wall of the cabinet for enabling the machine to be lowered by means of the drop shelf.

16 Claims, 10 Drawing Figures

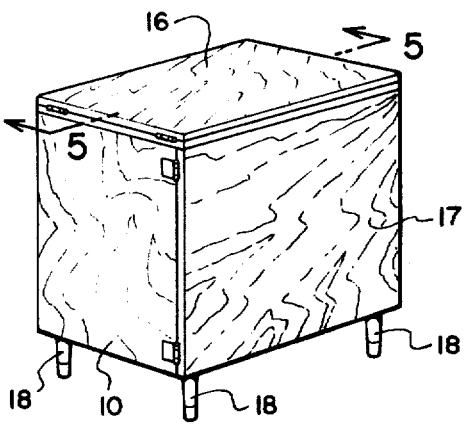
FIG. 1
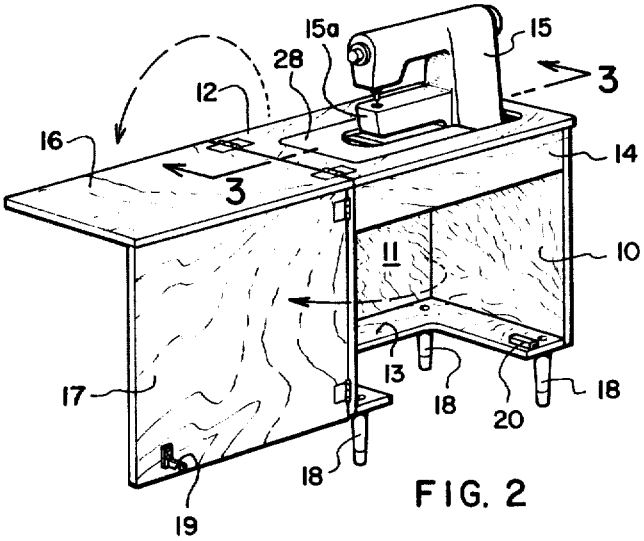
FIG. 2
FIG. 3
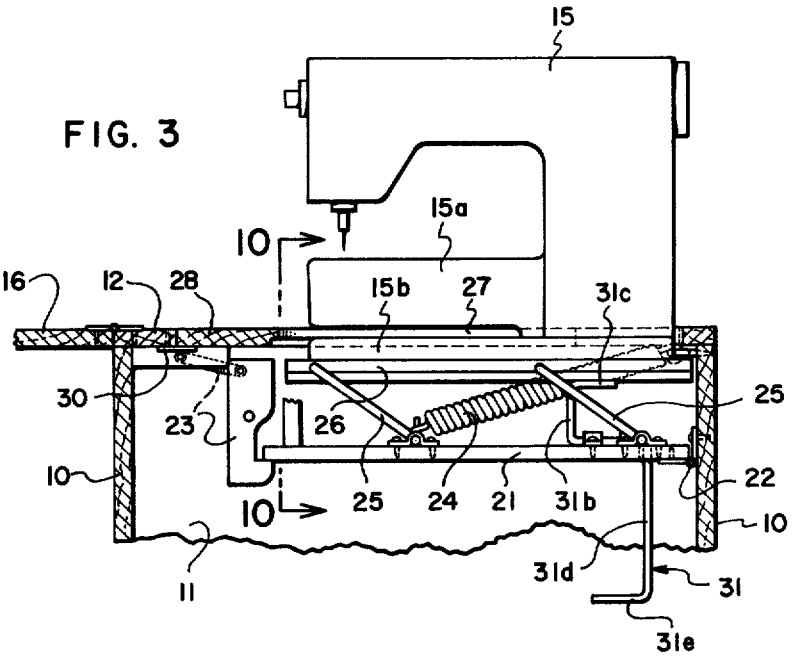
FIG. 4
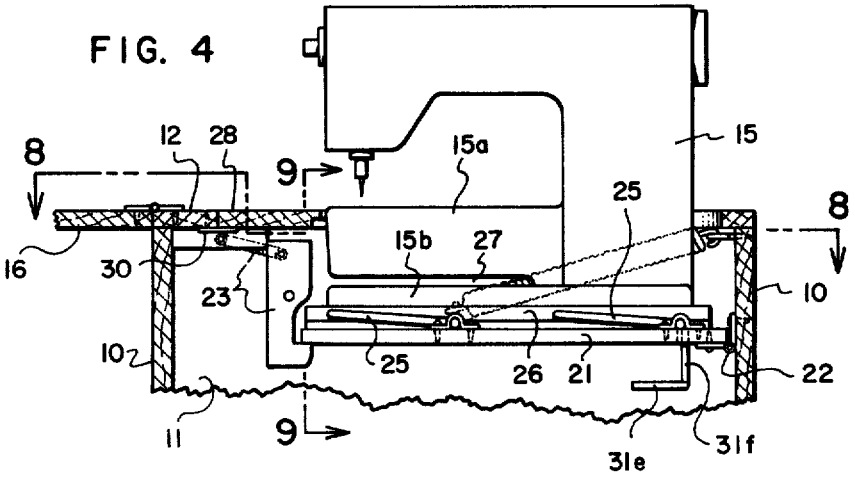

FIG. 6
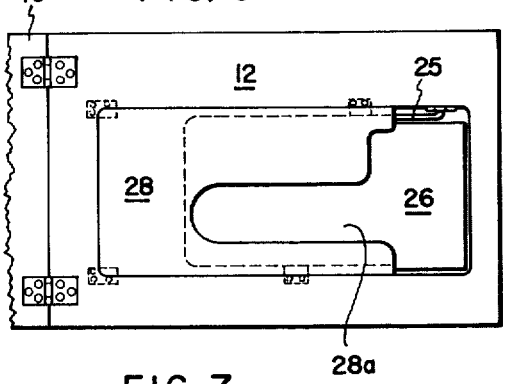
FIG. 7
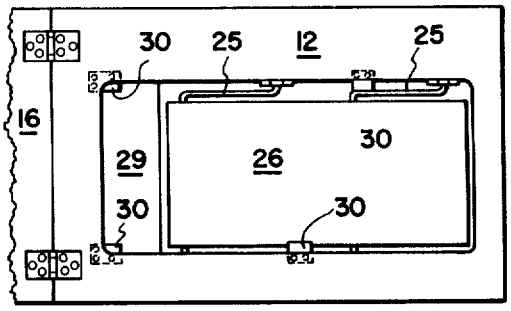
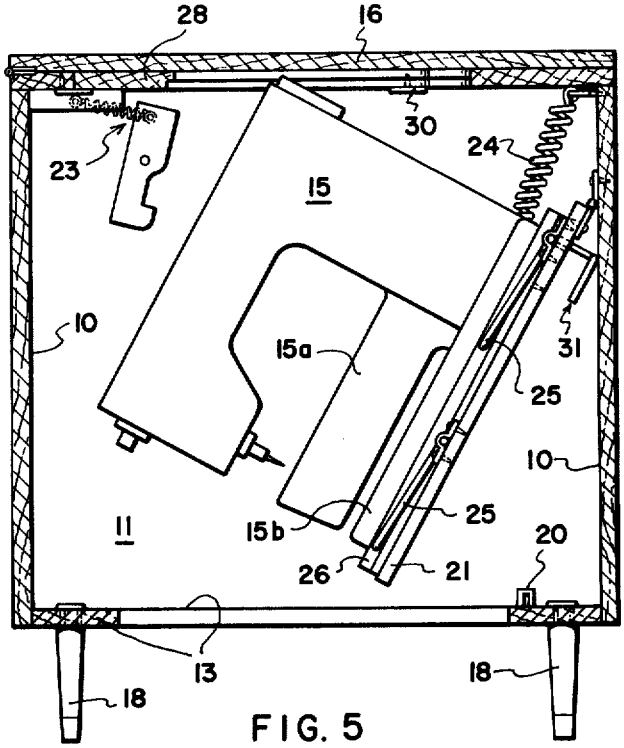
FIG. 5
FIG. 8
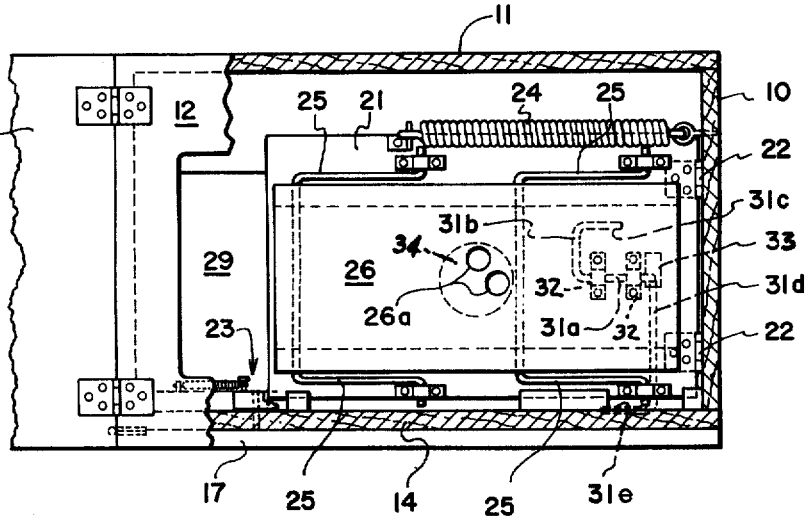
FIG. 9
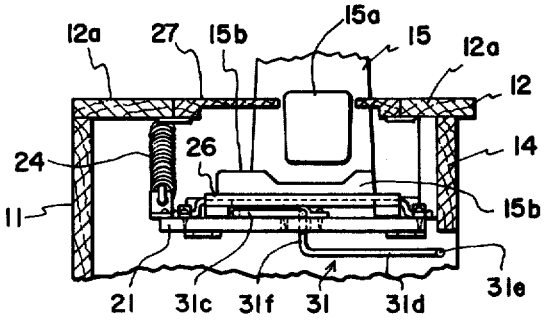
FIG. 10
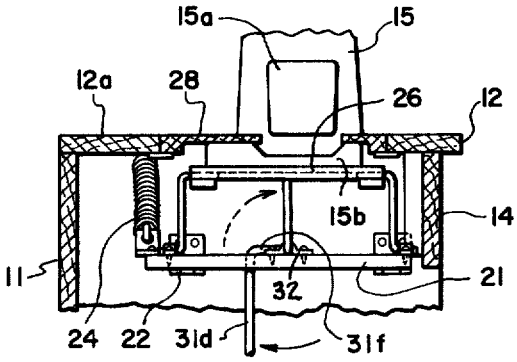

WORK CABINET FOR SEWING MACHINE

Matter enclosed in heavy brackets [ ] appears in the original patent but forms no part of this reissue specification; matter printed in italics indicates the additions made by reissue.

BACKGROUND OF THE INVENTION

1. The invention is in the general field of cabinets having drop shelves for supporting machines in positions to be worked and for lowering such machines into the cabinet interiors to house them when not being worked.

2. State of the Art

Sewing machine cabinets adapted to both house a sewing machine when not in use and provide a work table therefor when being used are well known in a variety of different forms, as are drop shelf cabinets in general. However, most of the cabinets are not adapted to the type of sewing machine known as an "open-arm," wherein the lower bobbin portion of the machine is formed as an arm underlying the needle-holding portion of the machine and spaced upwardly from the base of the machine so as to enable such bobbin portion or "open-arm" to enter sleeves of garments, socks, and other items of similar nature for convenience in the sewing or mending thereof. Moreover, most of the sewing machine cabinets known prior to the present invention have been complicated, unhandy to use, and relatively expensive to produce. Although work tables for open-arm sewing machines have been provided with parallel motion linkage for raising and lowering the sewing machine between open-arm work position and regular work position and vice versa, such linkage has never been successfully adapted to cabinets for open-arm sewing machines, so far as applicants are aware.

SUMMARY OF THE INVENTION

The present invention is particularly applicable to open-arm types of sewing machines, but it may be used for any sewing machine which can advantageously ultilize its special structural and functional features.

In accordance with the invention, a drop shelf is provided internally of the cabinet below the top wall threreof, being normally maintained in horizontal position but arranged to hinge downwardly upon the release of suitable latch mechanism to lower the sewing machine into a protectively housed position when not in use. Carried on such drop shelf, by means of linkage, is a mount for a sewing machine. The linkage is preferably parallel motion mechanism permitting the mount to be raised and lowered with respect to the upper surface of the drop shelf, but may be any type of linkage permitting such raising and lowering.

For raising and lowering such sewing machine mount relative to the drop shelf, a lever is pivotally fulcrumed on the shelf and has a work arm underlying the mount and adapted to raise and lower such mount when a power arm portion thereof is operated, usually manually, by the user reaching into the cabinet below the drop shelf when the latter is in its raised position and grasping such power arm portion.

When an open-arm type of sewing machine is mounted on the machine mount, raising of such mount relative to the drop shelf by which it is carried places the machine in open-arm working position with respect to the top working surface of the cabinet. Lowering of such mount places the machine in normal sewing position relative to the top working surface of the cabinet.

In order to permit lowering of the drop shelf from its raised position, so as to lower the sewing machine into the interior of the cabinet, the top wall of the cabinet is apertured sufficiently to provide an accommodation opening providing leeway for lowering the machine. For work purposes, a removable insert is provided to serve as a continuation of the limited top working surface provided by the top wall of the cabinet itself. This insert is put into place around the machine in its work positions, but is removed when it is desired to lower the sewing machine into the cabinet for storage.

THE DRAWING

The best mode presently contemplated for carrying out the invention in practice is illustrated in the accompanying drawings, in which:

FIG. 1 represents a front perspective view of a sewing machine cabinet constructed in accordance with the invention, and the cabinet being shown completely closed;

FIG. 2, a perspective view of the cabinet of FIG. 1 fully opened, with drop shelf raised, machine mount raised, an open-arm sewing machine in working position on the machine mount, and top insert in place about the base of the machine for open-arm sewing;

FIG. 3, a fragmentary vertical section taken along the line 3—3 of FIG. 3 and drawn to a larger scale;

FIG. 4, a view corresponding to that of FIG.3, but showing the machine mount lowered so the sewing machine is in regular working position;

FIG. 5, a longitudinal vertical section taken along the line 5—5 of FIG. 1 and drawn to the larger scale of FIGS. 3 and 4;

FIG. 6, a fragmentary top plan view of the cabinet of FIG. 1 as it appears with top open, insert in place, drop shelf raised and machine mount lowered, but sewing machine removed;

FIG. 7, a view corresponding to that of FIG. 6, but with top wall insert removed;

FIG. 8, a fragmentary, combined top plan and horizontal section taken along the line 8—8 of FIG. 4, the sewing machine having been removed;

FIG. 9, a fragmentary, transverse, vertical section taken along the line 9—9 of FIG. 4; and FIG. 10, a view corresponding to that of FIG. 9 but taken along the line 10—10 of FIG. 3.

DETAILED DESCRIPTION OF THE ILLUSTRATED EMBODIMENT

In the form illustrated, the sewing machine cabinet of the invention comprises a pair of opposite end walls 10, respectively; a rear wall 11; an apertured top wall 12; a deeply indented bottom wall 13; a narrow front wall 14 immediately below top wall 12 providing, along with the indentation in bottom wall 13, for the accommodation of the lap, knees, legs and feet of a user seated in front of the sewing machine 15 in one or the other of the two work positions provided therefor; a hinged top cover 16; and a hinged front door 17. Legs 18 support the cabinet above a floor or other supporting surface, and a latch 19 and keeper 20 hold door 17 closed when shut as in FIG. 1.

Within the cabinet and spaced appropriately below top wall 12 thereof is a drop shelf 21 hingedly secured, as at 22, to one of the end walls 10. Latch mechanism 23 normally supports the opposite end of drop shelf 21 in horizontal, work position, see particularly FIGS. 3 and 4, but is adapted for manual release so the shelf can drop under the weight of sewing machine 15 to the lowered position of FIG. 5. A spring 24, tensioned by the dropping of shelf 21, stands ready to assist in raising the shelf and the relatively heavy sewing machine supported thereby from stored position to the normal, horizontal, shelf position.

Although the drop shelf is here shown as being hinged at one of its ends to an end wall of the cabinet, it may, if desired, be hinged lengthwise to and along the rear wall or even the front wall of the cabinet, it being then necessary to hinge either the front or rear longitudinal portion of the top wall to enable it to be turned either down or up to provide leeway for dropping the sewing machine into the lowered, storage position.

Carried on drop shelf 21 for raising from a work position resting on such shelf to a different work position spaced above the shelf, as by means of sets of parallel links 25, is a sewing machine mount 26. In the present instance, such mount 26 is of panel formation provided with holes 26a, respectively, appropriately placed for receiving conventional anchoring means (not shown) of the open-arm type of sewing machine 15. The first or regular work position of machine mount 26, as shown in FIG. 9, places the top work surface of open-arm 15a more or less in planar registry with the top work surface 12a of top wall 12 of the cabinet. The raised, second work position of machine mount 26, as shown in FIG. 10, places open arm 15a of the sewing machine more or less entirely above the top work surface 12a of the cabinet, so that the gap 27 between base 15b of the sewing machine and open-arm 15a thereof is free and open for open-arm sewing.

It should be noted that, for use of the sewing machine in both its regular and in its raised, open-arm work positions, an insert 28 for the aperture 29 in top wall 12 of the cabinet is provided to supply a continuation of the limited top work surface 12a provided by top wall 12 of the cabinet. Such insert 28 is itself provided with an elongate aperture 28a, FIG. 6, for accommodating the sewing machine in both the regular and raised work positions thereof.

Insert 28 is supported by bracket pieces 30 secured to the underside of top wall 12 of the cabinet and projecting below aperture 29 as seats for insert 27. When it is desired to lower the sewing machine into the interior of the cabinet for protectively housed storage, it is only necessary to remove insert 28, leaving aperture 29 in top wall 12 of the cabinet unencumbered so the machine can be lowered by means of drop shelf 21 into the position shown in FIG. 5.

In accordance with the invention, machine mount 26 is quickly and easily raised or lowered with respect to drop shelf 21 by means of a lever 31 which is fulcrumed on drop shelf 21. Lever 31 is preferably formed by bending a metal rod to provide an intermediate portion 31a, which is pivotally held on shelf 21 by bearings 32, a work arm portion 31b having its free end 31c bent and underlying sewing machine mount 26 to exert upward thrust thereon, and a power-input arm portion 31d underlying drop shelf 21 with its free end bent as a handle portion 31e for grasping in the manual operation of the lever. For convenience of handling, power-input arm 31d of lever 31 is right-angular, with a portion 31f, FIG. 9, that is substantially vertical in the normal, lowered position of machine mount 26, placing the main portion of such power-input arm 31d substantially horizontal and extending toward the front of the cabinet where handle 31e can be easily grasped and pushed downwardly to raise machine mount 26 to open-arm work position shown in FIG. 10. Lowering of the machine mount from such raised work position is as easily accomplished by reaching through the open front of the cabinet, grasping handle 31e, and pulling the power-input arm 31d toward the operator so that it raises into the horizontal position shown in FIG. 9. For accommodating the bent portion 31f of power-input arm 31d in the raised position of machine mount 26, drop shelf 21 is apertured as at 33, FIG. 8.

For stability, it is preferred that lever 31 be arranged so its work arm 31b just passes dead center in the raised position.

A significant advantage of the present invention is the fact that the open-arm, bobbin portion of the machine is exposed and coveniently available in the raised position of the sewing machine mount, as can be seen from FIGS. 2–4 and 10.

Although the parallel linkage mechanism shown is presently preferred, other forms of linkage fastening machine mount 26 to drop shelf 21 and permitting raising and lowering thereof with respect to the drop shelf, may be used, as can various configurations of levers for raising and lowering such machine mount relative to the top surface.

To accommodate the anchoring means for the sewing machine when mount 26 is lowered onto shelf 21, an aperture 34 may be provided in such shelf.

Whereas this invention is here illustrated and described with respect to an embodiment thereof presently contemplated as the best mode of carrying out the invention in practice, various changes can be made without departing from the inventive concepts defined by the claims hereof.

We claim:

1. A sewing machine cabinet, comprising walls defining a housing for receiving and storing a sewing machine, said walls including an apertured top wall providing a top work surface for the cabinet; a drop shelf spaced below said top wall under the aperture thereof and hingedly attached to a wall of the cabinet; latch means for normally holding said shelf in a substantially horizontal position; a sewing machine mount normally resting on said shelf and adapted to receive a sewing machine; link means attaching said mount to the shelf so as to permit raising of the mount, and of a sewing machine mounted thereon, from a lowered work position to a raised work position and vice versa relative to said shelf; and pivotally mounted lever means for raising and lowering said mount, said aperture in the top wall being sufficiently large to accommodate the sewing machine in its work positions and during the dropping thereof into storage position within the cabinet and the raising thereof from said storage position into a work position.

2. A cabinet according to claim 1, wherein the walls include side walls, and the drop shelf is hingedly attached to one of the side walls.

3. A cabinet according to claim 1, wherein the link means comprises parallel motion mechanism.

4. A cabinet according to claim 1, wherein a removable insert is provided for the aperture of the top of the cabinet to fit around a sewing machine mounted on the sewing machine mount when the drop shelf is in its horizontal position, so as to supplement the top work surface of the cabinet.

5. A cabinet according to claim 1, wherein the lever means comprises a lever pivotally fulcrumed on the dropshelf and having a work arm underlying the sewing machine mount and a power-input arm underlying said shelf.

6. A cabinet according to claim 5, wherein the lever has an intermediate portion mounted in bearings on the drop shelf and serving as the fulcrum.

7. A cabinet according to claim 6, wherein the power-input arm of the lever has a substantially right-angle portion proximate the intermediate, fulcrum portion of the lever, that places the remainder of said power-input arm in substantially horizontal position beneath the drop shelf in the lowered position of the sewing machine mount, and wherein the said shelf is apertured to accommodate said right-angle portion as the lever is moved from one position to another.

8. A cabinet according to claim 7, wherein the free terminus of the work arm of the lever is substantially at right angles to the remainder of the work arm as support for the sewing machine mount.

9. A cabinet according to claim 8, wherein the free terminus of the power-input arm is substantially at right angles to the portion of said arm from which it extends, to provide a handle for manual operation of the lever.

10. A cabinet according to claim 9, wherein the lever is a metal rod bent to formation.

*11. In combination, structure including an apertured work top for accommodating an open-arm type of sewing machine in both normal working position and open-arm working position; a movable, sewing machine mount disposed below the aperture of said work top so that a sewing machine mounted thereon may be placed in either normal or open-arm working position relative to said work top; link means attaching said mount to said structure so as to permit raising of the mount, and of a sewing machine mounted thereon, from a lowered work position to a raised work position and vice versa relative to said work top; and pivotally mounted lever means for raising and lowering said mount, and a sewing machine mounted thereon, to and from open-arm working position within said aperture, said lever means comprising a lever pivotally fulcrumed about an axis disposed below said mount and having a work arm underlying said mount in lifting position and a power-input arm underlying said link means for raising and lowering said work arm.*

*12. A combination in accordance with claim 11, wherein the structure includes a substantially horizontal supporting panel below the aperture of the work top and to which the link means are attached; and wherein the lever has an intermediate portion mounted in bearings on the supporting panel and serving as the fulcrum.*

*13. A combination in accordance with claim 12, wherein the power-input arm of the lever has a substantially right-angle portion, proximate the fulcrum portion of the lever, that places the remainder of said power-input arm in substantially horizontal position beneath the supporting panel in the lowered position of the sewing machine mount, and wherein the said panel is apertured to accommodate said right-angle portion as the lever is moved from one position to another.*

*14. A combination in accordance with claim 13, wherein the free terminus of the work arm of the lever is substantially at right angles to the remainder of the work arm as support for the sewing machine mount.*

*15. A combination in accordance with claim 14, wherein the free terminus of the power-input arm is substantially at right angles to the portion of said arm from which it extends, to provide a handle for manual operation of the lever.*

*16. A combination in accordance with claim 15, wherein the lever is a metal rod bent to formation.*

* * * * *